(12) United States Patent
Hiraki et al.

(10) Patent No.: US 8,518,542 B2
(45) Date of Patent: Aug. 27, 2013

(54) CARBON FILM AND CARBON FILM STRUCTURE

(75) Inventors: Akio Hiraki, Hyogo (JP); Masanori Haba, Tokyo (JP); Hong-Xing Wang, Osaka (JP)

(73) Assignee: Life Technology Research Institute, Inc., Niigata (JP)

( * ) Notice: Subject to any disclaimer, the term of this patent is extended or adjusted under 35 U.S.C. 154(b) by 650 days.

(21) Appl. No.: 12/471,496

(22) Filed: May 26, 2009

(65) Prior Publication Data

US 2010/0304077 A1  Dec. 2, 2010

(51) Int. Cl.
*B32B 9/00* (2006.01)

(52) U.S. Cl.
USPC .................. 428/408; 423/448; 977/742

(58) Field of Classification Search
USPC .................. 428/408; 423/447.1; 977/742
See application file for complete search history.

(56) References Cited

U.S. PATENT DOCUMENTS 7,261,941 B2 * 8/2007 Iijima et al. ............ 428/408

* cited by examiner

*Primary Examiner* — Veronica Ewald
*Assistant Examiner* — Daniel H Miller
(74) *Attorney, Agent, or Firm* — Lee Fredric Sharra

(57) ABSTRACT

The present invention provides a carbon film that is remarkably excellent in current voltage (IV) characteristics. This is achieved by way of a carbon film structure, two or more carbon film assembly units 12 are formed on a substrate 10. The carbon film assembly units 12 comprise: a stem-like carbon film 14 which is made into a film in the shape of a long and thin needle; and a branch-like carbon film cluster 16 which is made into a film so as to surround the stem-like carbon film 14 from the halfway to the lower part of this stem-like carbon film 14. The stem-like carbon film 14 has the shape of a long and thin needle having a configuration which has a spiral streak-like step part 18 towards the distal end at the circumference face of a near tip and in which the radius becomes small as going to the distal end.

7 Claims, 13 Drawing Sheets

10 μm

20nm

CARBON FILM AND CARBON FILM STRUCTURE

DETAILED DESCRIPTION OF THE INVENTION

1. Field of the Invention

This invention relates to the carbon film and carbon film structure which are formed at the sharp shape of having been suitable for a tip performing field emission.

2. Background of the Invention

Field emission is a phenomenon in which an electron is emitted to a vacuum by electric field concentrates, and the carbon nanotube has been developed as what performs this field emission. A carbon nanotube is what was excellent in the field emission characteristic very long and slender for the high aspect ratio, and is supposed that a field electron emission element can be obtained. The time of impressing the voltage V between the anode and cold cathode, and carrying out field emission to the field emission characteristic (IV characteristic) from cold cathode, It is the characteristic shown with the curve which shows the voltage V and a relation with the field emission current I, and characterizes in the voltage (threshold), the inclination of the above-mentioned curve, and shape which start field emission.

There is a cold cathode fluorescent lamp to which carry out the placed opposite of the anode with a fluorescent substance to such cold cathode, and impresses voltage (positive-negative bath voltage) between cold cathode and the anode, make electrons emit by field emission from cold cathode, a fluorescent substance is made to carry out the acceleration collision of this emitted electron, and excited light of the fluorescent substance is carried out.

The electron emission of the specified quantity is required for luminescence of this fluorescent substance. The current potential (IV) characteristic curve which sets a vertical axis as the emission current which shows this electron emission amount, sets a horizontal axis as positive-negative bath voltage, and is shown shows the electron emission performance of cold cathode.

In the case of a carbon nanotube, inclination of the above-mentioned IV characteristic curve rises gently. Therefore, in a carbon nanotube, the voltage V required to obtain an emission current for a fluorescent substance to make luminescence starting becomes high.

However, that the value of the impressed electromotive force V for obtaining a desired emission current is large has a technical problem of the power supply equipment being required or influencing manufacture of the above-mentioned cold cathode fluorescent lamp. Then, realization of the carbon film for cold cathode which provides IV characteristic that the emission current which can carry out the luminescence start of the fluorescent substance with the lower impressed electromotive force V can be obtained was desired.

BACKGROUND ART

Document 1—JP10-223128A

DESCRIPTION OF THE INVENTION

Problems to be Solved by the Invention

These people were able to develop the needlelike carbon film excellent in IV characteristic that the emission current for which it asks with lower impressed electromotive force can be obtained, by having had the shape which becomes small needlelike as it inquired wholeheartedly, it replaced with the carbon nanotube etc. in view of the above and the radius went at the tip. This invention can come to provide the carbon film excellent in IV characteristic that the emission current for which it asks with further more low impressed electromotive force can be obtained, as a result of repeating improvement in the structure of such a needlelike carbon film further.

Means for Solving the Problem

A graphene sheet overlaps with multiple layers, and it has become internal hollow, and a radius is provided with acicular shape which becomes small towards a tip, and a carbon film that this invention is provided with.

This invention has preferably the muscle-like level difference part, a stripe shaped stepped portion, which followed a circumference of a peripheral face of the nearly tip towards the tip concerned.

Preferably, the above-mentioned muscle-like level difference part turns a circumference of a peripheral face of the above-mentioned nearly tip at the tip concerned, becomes spiral and is continuing.

Towards a tip, a needlelike carbon film unit of internal hollow which a two or more layers graphene sheet lapped, and became spiral preferably is piled up in a stage, and are constituted, and the above-mentioned muscle-like level difference part is formed spirally on a boundary of each needlelike carbon film unit.

The above "shape of a muscle" is an example of expression at the time of specifying width and shape of the continuous direction, not limiting them, and observing with a TEM photograph, and it has a portion which becomes a level difference part with square emission sites effective in field emission at least.

It is not limited to following the above "continuation" thoroughly, but a case where it continues selectively can be included.

A gestalt projection, a muscle-like level difference part, which bulges spirally from a peripheral face of the above-mentioned carbon film. The radius becomes smaller continuously to a predetermined height towards a gestalt which projects, or a tip, and a radius becomes small non-sequentially on the way, or a radius becomes large, subsequently, it is a muscle-like level difference part of a gestalt which a pace of film formation that a radius becomes small continuously changes spirally, and is carried out. It is a muscle-like level difference part of structure on which it is easy to centralize an electric field as a result.

This needlelike carbon film includes a case where a radius becomes small towards a tip as a whole in a radius even if a large portion exists selectively from arbitrary positions before a tip. On the way before reaching the tip, from arbitrary positions, even if it is not necessary to limit a portion when straight, and it is changing the shape of a curve, in the shape of a polygonal line, etc. in a portion on the way, it is good for a radius to become small towards a tip as a whole. A position of the above-mentioned arbitration is not limited to a base of a carbon film, and is good even from an intermediate position.

In a carbon film by this invention, since the tip tapers off as basic structure and is an effective emission-sites structure with shape, It is the carbon film which could obtain a desired emission current with low impressed electromotive force towards a tip like a carbon nanotube unlike a carbon film with a constant radius, and was excellent in IV characteristic.

And in a carbon film by this invention, since a peripheral face of the nearly tip was equipped with a spiral muscle-like level difference part towards the tip concerned in addition to the above-mentioned basic structure, it becomes effective emission sites which carry out electric field concentrates, field emission is performed, a desired emission current can be obtained with impressed electromotive force lower than a needlelike carbon film without a muscle-like level difference part to a nearby pan, and IV characteristic is markedly alike and its muscle-like level difference parts, but not only the tip, improves.

Come to form two or more carbon film set units on a substrate, and carbon film structure by this invention these carbon film set unit, Have a stem-like carbon film and a branch-like carbon film group currently formed so that it may apply to the film lower part from film halfway of this stem-like carbon film and the stem-like carbon film concerned may be surrounded, and the above-mentioned stem-like carbon film, It has acicular shape to which a graphene sheet laps with a multilayer, and it has become internal hollow, and a radius becomes small towards a tip.

The above-mentioned stem-like carbon film has preferably the muscle-like level difference part which is following a circumference of a peripheral face of the nearly tip towards the tip concerned.

In this invention, since a radius has the shape which becomes small towards a tip, a stem-like carbon film is a carbon film which could obtain a desired emission current with low impressed electromotive force, and was excellent in IV characteristic like above-mentioned this invention first.

And since in addition to this stem-like carbon film it applies to the film lower part from film halfway of a needlelike carbon film and a branch-like carbon film group comprises this invention further, by this branch-like carbon film group, a posture of a stem-like carbon film is stable, it can be stabilized and electrons can be emitted.

In this invention, when electron emission is performed again also from a needlelike carbon film which constitutes a branch-like carbon film group, the whole amount of field emission increases and it uses for a source of field electron emission of a field emission type lighting lamp, a high-intensity lighting lamp can be provided.

In addition to stability as an electron emission source of a lighting lamp improving, as a result of being supported mechanically, breaking down from this invention on a substrate and becoming further difficult to be crowded, when membranes are formed with them on a substrate, even if a diameter of a stem-like carbon film is thin, Electrical contact with a substrate for slushing current can be taken by a branch-like carbon film group.

In this invention, a sheet shaped, the shape of a wall, and a carbon film of various needlelike projections are formed preferably at the above-mentioned muscle-like level difference part. When a sheet shaped, the shape of a wall, and a carbon film of various needlelike projections are formed at a muscle-like level difference part, a desired emission current can be obtained with impressed electromotive force further more lower than a case of only a muscle-like level difference part, and IV characteristic improves further more.

Effect of the Invention

According to this invention, a carbon film which was markedly alike and was superior to the carbon nanotube in IV characteristic can be obtained.

BEST MODE OF CARRYING OUT THE INVENTION

The carbon film hereafter applied to an embodiment of the invention with reference to the attached drawing is explained.

Two or more carbon film set units 12 are formed on the substrate 10, and the structure of the carbon film of an embodiment is constituted, as FIG. 1 shows. These carbon film set unit 12 is formed at the predetermined intervals on the substrate 10. The carbon film set unit 12 comprises the long and slender needlelike stem-like carbon film 14 in which a radius becomes small towards a tip, and the branch-like carbon film group 16 currently formed so that it may apply to the film lower part from the film halfway of this stem-like carbon film 14 and the stem-like carbon film 14 concerned may be surrounded. The stem-like carbon film has composition with the muscle-like level difference part 18 of continuous state towards the tip concerned in the peripheral face of a nearly tip so that the circular parts in a figure may be pulled out and it may surround with the circle P. The sheet shaped which grew as it went to the lower part from film halfway at the these muscle-like level difference part 18, the shape of a wall, and the carbon film 20 of various needlelike projections are formed. This muscle-like level difference part 18 becomes spiral, and is continuing towards the tip of the stem-like carbon film 14.

In the carbon film structure of the embodiment provided with the above composition. Since it is formed on the substrate 10 by the carbon film set unit 12 and the stem-like carbon film 14 is formed for the radius towards the tip with structure with the acicular shape which becomes small to the basic structure which the branch-like carbon film group 16 serves as the whole basic structure, and serves as the foundation, It is the carbon film composition excellent in IV characteristic that a desired emission current can be obtained with low impressed electromotive force towards a tip like a carbon nanotube unlike a carbon film with a constant radius.

Since the carbon film set unit 12 separates an interval, and is arranged, and the stem-like carbon film 14 for every carbon film set unit 12 does not check mutual electron emission, its electron emission performance improves.

Since especially the stem-like carbon film 14 was provided with the needle shape to which a radius becomes small towards a tip in the internal hollow where the graphene sheet lapped with the multilayer and the peripheral face which goes at the tip is equipped with the spiral muscle-like level difference part 18, field emission is performed, a desired emission current can be obtained with the impressed electromotive force lower than the case where it is a needlelike carbon film without the muscle-like level difference part 18 to a nearby pan, and IV characteristic boils markedly not only a tip but its muscle-like level difference part 18, and improves.

Since the sheet shaped which grew as it went to the lower part from film halfway at the muscle-like level difference part 18, the shape of a wall, and the carbon film 20 of various needlelike projections are formed, these are also the composition on which it is easy to centralize an electric field, and can contribute to improvement in the above-mentioned IV characteristic.

Since the posture of the stem-like carbon film 14 is stable and electrical contact can also be secured by the branch-like carbon film group 16, stable discharge of the electron can be carried out over a long period of time.

Hereafter, with reference to a SEM photograph image etc., the structure of the carbon film of an embodiment is explained in detail.

Carbon Film Structure

A TEM (transmission electron microscope) photograph image is shown in a series of SEM (scanning electron microscope) photograph images which photographed the carbon film of the embodiment by FIG. 9 from FIG. 2, and FIG. 10.

An expansion SEM photograph image is further shown in the plane view SEM photograph image of the carbon film applied to an embodiment at FIG. 2, and FIG. 3. Many carbon film set units 12 are photographed in the SEM photograph image of this. The size unit is filled in into the photograph image. By FIG. 1, a 1-micrometer unit is filled in per 10 micrometers at FIG. 2. At FIG. 1 and FIG. 2, these carbon film set unit 12 is formed at the overall almost equivalent interval. The carbon film set unit 12 is several micrometers to not less than about ten micrometers in diameter. Although the plane shape of the branch-like carbon film group 16 can be checked among the stem-like carbon film 14 which constitutes the carbon film set unit 12 from FIG. 2 and a SEM photograph image of the plane view of FIG. 3, and the branch-like carbon film group 16, since the stem-like carbon film 14 is needle-like, the shape cannot be checked.

FIG. 4 thru FIG. 7—the above-mentioned carbon film set unit 12—a from oblique direction a SEM photograph image is shown a little from an oblique direction. The size unit is filled in into the photograph image. Per 10 micrometers, by a 10-micrometer unit and FIG. 5, these units fill them in, are filled in by FIG. 6, and are filled in per 10 micrometers by FIG. 7 per micrometer at FIG. 4. The height of the carbon film set unit 12 is about ten micrometers to several 10 micrometers except for the stem-like carbon film 14 from these SEM photograph images. The state where the branch-like carbon film group 16 has coiled around the circumference of the stem-like carbon film 14 can be checked. It can check that the carbon film set unit 12 is arranged with the prescribed interval.

The SEM photograph image which photographed the stem-like carbon film 14 is shown in FIG. 8 and FIG. 9. The size unit is filled in into the photograph image. By FIG. 8, a 1-micrometer unit is filled in per micrometer at FIG. 9. It is shown that the radius became small towards the tip and the stem-like carbon film 14 is provided with the effective tip shape as emission sites. The stem-like carbon film 14 can check the state where it has projected from the branch-like carbon film group 16. It can check that that radius is small as this stem-like carbon film 14 goes at a tip.

Some TEM photograph images of the nearly tip of the stem-like carbon film 14 are shown in FIG. 10. The nearly tip of the stem-like carbon film 14 of FIG. 10 shows FIG. 11 typically the whole nearly tip of the stem-like carbon film 14, although the whole is not shown on account of photography of a TEM photograph image. A part of nearly tip of the stem-like carbon film 14 shown in the TEM photograph image of FIG. 10 is expanded simple, and the portion enclosed with the circle Q of FIG. 11 shows it. The stem-like carbon film 14 turns the circumference of the peripheral face at the tip concerned, and has the muscle-like level difference part 18 formed by becoming spiral as it can check by FIG. 10 and is shown by FIG. 11. A sheet shaped, the shape of a wall, and the carbon film 20 of needlelike (etc.) are formed at the these muscle [that become spiral and continue]-like level difference part 18. Especially, this sheet shaped, the shape of a wall, and the carbon film 20 of needlelike (etc.) are large towards the film middle of the stem-like carbon film 14 to the lower part, and it is thought that these constitute the branch-like carbon film group 16. The these muscle-like level difference part 18 and the carbon film 20 are provided with the effective shape as emission sites.

Needlelike carbon film unit of the internal hollow which, as for the stem-like carbon film 14, the two or more layers graphene sheet lapped, and became spiral in the enlarged drawing of the portion enclosed with the circle of FIG. 11—Towards a tip, $19n-1$ or $19n$ and $19n+1$—are piled up in the stage, and are constituted. Each needlelike carbon film unit—The muscle-like level difference part 18 of $19n-1$ or $19n$ and $19n+1$—spiral on a boundary is formed. As this FIG. 11 shows, the muscle-like level difference part 18 has the effective shape as emission sites.

The IV Characteristic of a Carbon Film

FIG. 12 is a figure showing the current voltage (IV) characteristic of the above-mentioned carbon film. In FIG. 12, IV characteristic curve according [A] to the conventional carbon nanotube, IV characteristic curve by the needlelike carbon film in which [B] does not have a muscle-like level difference part, and [C] are IV characteristic curves by a carbon film with the spiral muscle-like level difference part of the above of an embodiment. Although the voltage (threshold) on which compares these IV characteristic curves, and any IV characteristic curve starts field emission so that clearly is not so much different, inclination and shape of IV characteristic curve are greatly different. Namely, it is a curve with large impressed electromotive force for obtaining the emission current for which it asks in the IV characteristic curve A of a carbon nanotube, The impressed electromotive force which obtains a desired emission current in the IV characteristic curve B by a needlelike carbon film without a muscle-like level difference part is a curve which becomes lower than the case of a carbon nanotube. The impressed electromotive force for obtaining the emission current for which it asks in the IV characteristic curve C by a carbon film with the spiral muscle-like level difference part of the above of an embodiment is a curve which ends lowest. Therefore, IV characteristic curve has the best carbon film of an embodiment, and it is clear that the IV characteristic is the carbon film which improved greatly.

Since the adjustable range of field emission current is very wide as an electron emission source which carries out field emission with the stem-like carbon film provided with the sharp tip, the application range to various kinds of devices, a device, etc. can make it expand greatly in the carbon film structure of an embodiment in the above. In spite of having especially an aspect ratio which is a ratio of the height to a diameter in the carbon nanotube and the equivalent grade, It is the carbon film structure which is that a tip cannot swing easily due to a branch-like carbon film group, and support mechanically, and high stability is on a substrate, can secure electrical contact with a substrate, high density is restrained unlike a carbon nanotube, and electric field concentrates break out easily this present invention is excellent in the electron emission characteristic.

Manufacture of Carbon Film

The example of manufacture of a carbon film is explained with reference to FIG. 13. FIG. 13 is an outline line-block diagram of a film deposition system.

The couple of parallel plate electrodes 22 and 24 are placed opposite and is carried out into the vacuum-film-formation room 21. The vacuum-film-formation room 21 is provided with the gas feed system 26 and the vacuum pumping system 28. The negative-electrode side of DC power supply 30 is connected to the upper parallel plate electrodes 22, and the anode side of DC power supply 30 is grounded. The lower parallel plate electrodes 24 are grounded. The upper plate electrode 22 consists of molybdenum material. SUS32 is arranged to about 22 upper plate electrode.

The gas introduced into the vacuum-film-formation room 21 is mixed gas of hydrogen and methane. The substrate 34 is carried on the lower parallel plate electrodes 24.

First, the vacuum-film-formation room 21 is exhausted by the vacuum pumping system 28, hydrogen gas is introduced from the gas feed system 26, the internal pressure is gradually decompressed to about 30 Torr, and vacuum-film-formation room 21 internal pressure is set to 30 Torr. If vacuum-film-formation room 21 internal pressure is set to 30 Torr, the pressure will be maintained 5 thru/or about 25 minutes.

In this case, when generating the plasma 36 among both the plate electrodes 22 and 24, current is made to increase even to about 2.5 A gradually and vacuum-film-formation room 21 internal pressure is set to 30 Torr by impression of DC power supply 30, current is maintained to 2.5 A. In this way, the oxide on the substrate 34 is removed.

Subsequently, if the mixed gas of hydrogen gas and methane is introduced from the gas feed system 26 in the vacuum-film-formation room 10, vacuum-film-formation room 21 internal pressure is gradually increased to about 75 Torr and vacuum-film-formation room 21 internal pressure is set to 75 Torr, this internal pressure will be maintained for about 2 hours. If current is made to increase even to about 6 A gradually from 2.5 A by DC power supply 30 simultaneously and 6 A is reached, the current will be maintained for 2 hours. The steam of the organic solvent of gas, such as the gas which replaces with methane and contains other carbon, for example, acetylene, ethylene, propane, and propylene, or carbon monoxide, carbon dioxide, ethanol, or acetone can be used.

As a result, substrate temperature will be 900° C. thru/or about 1150° C., methane is disassembled by the plasma 36 generated on the substrate 34, and the carbon film which explained [mentioned above] is formed in a substrate face.

BRIEF DESCRIPTIONS OF THE DRAWINGS

DESCRIPTION OF NOTATIONS

Figure 1:
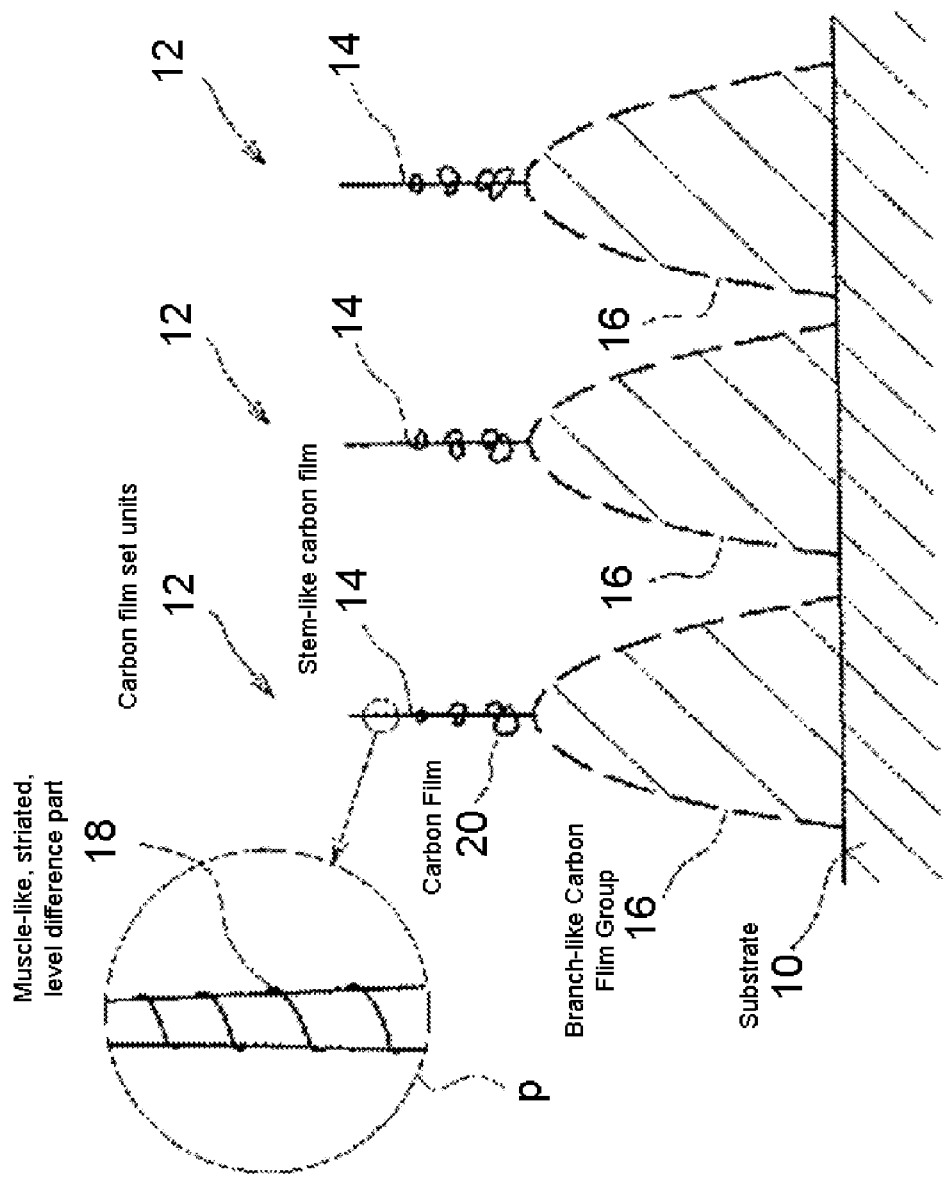
FIG. 1 is a figure showing the composition of the carbon film concerning an embodiment.
Figure 2:
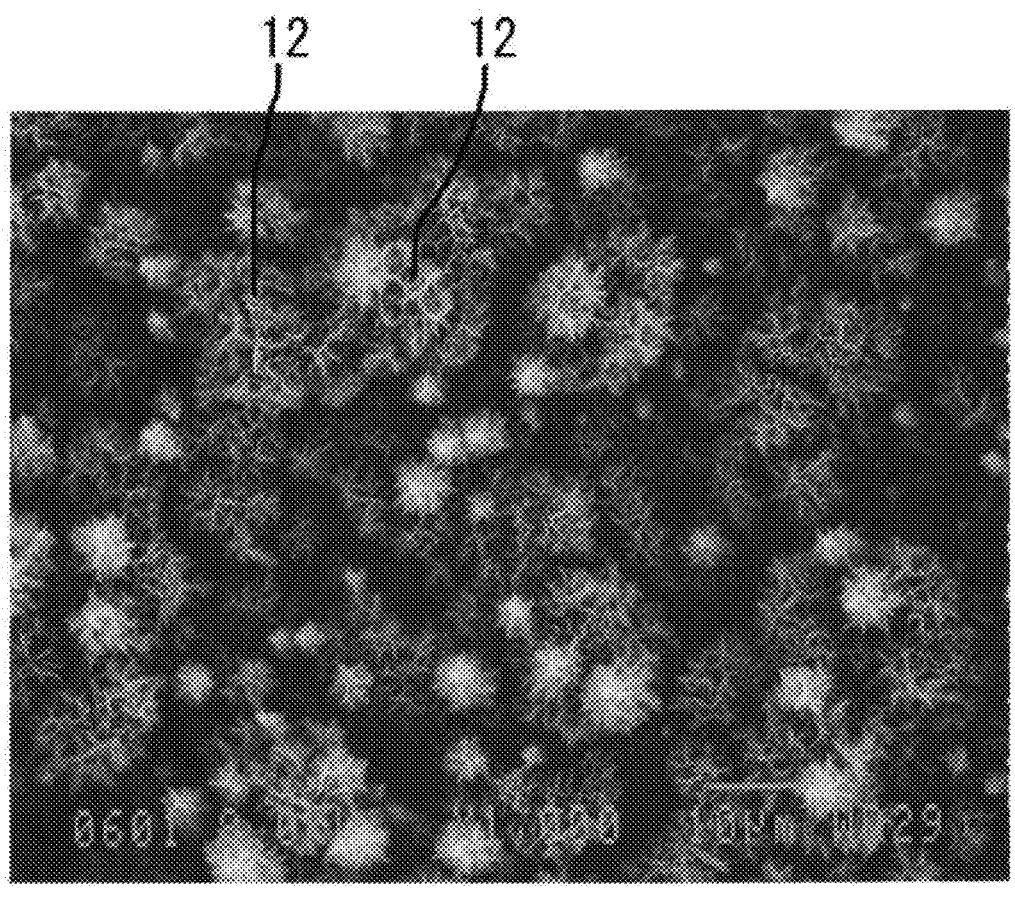
FIG. 2 is a plane view SEM photograph image of the carbon film concerning an embodiment.
Figure 3:
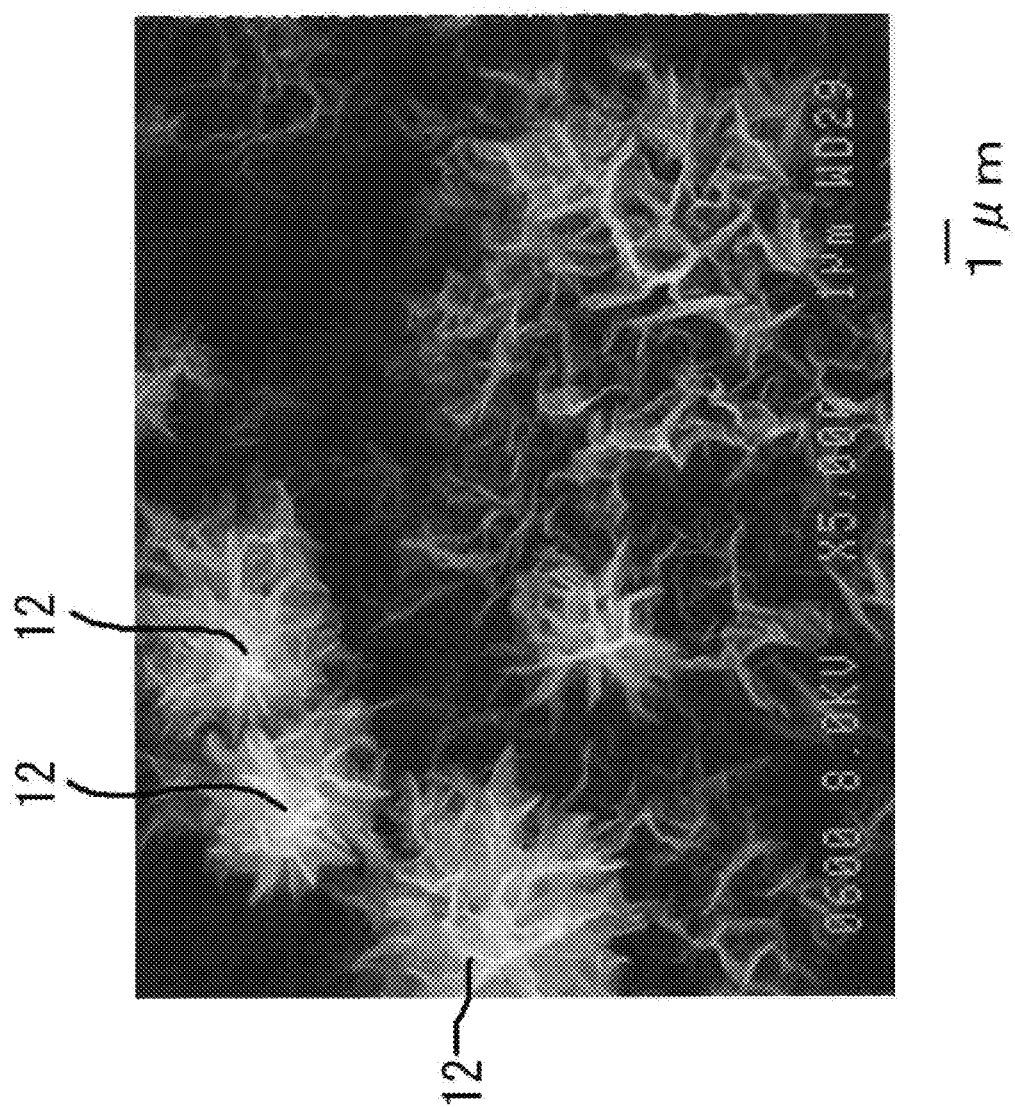
FIG. 3 is a plane view SEM photograph image of the carbon film concerning an embodiment.
Figure 4:
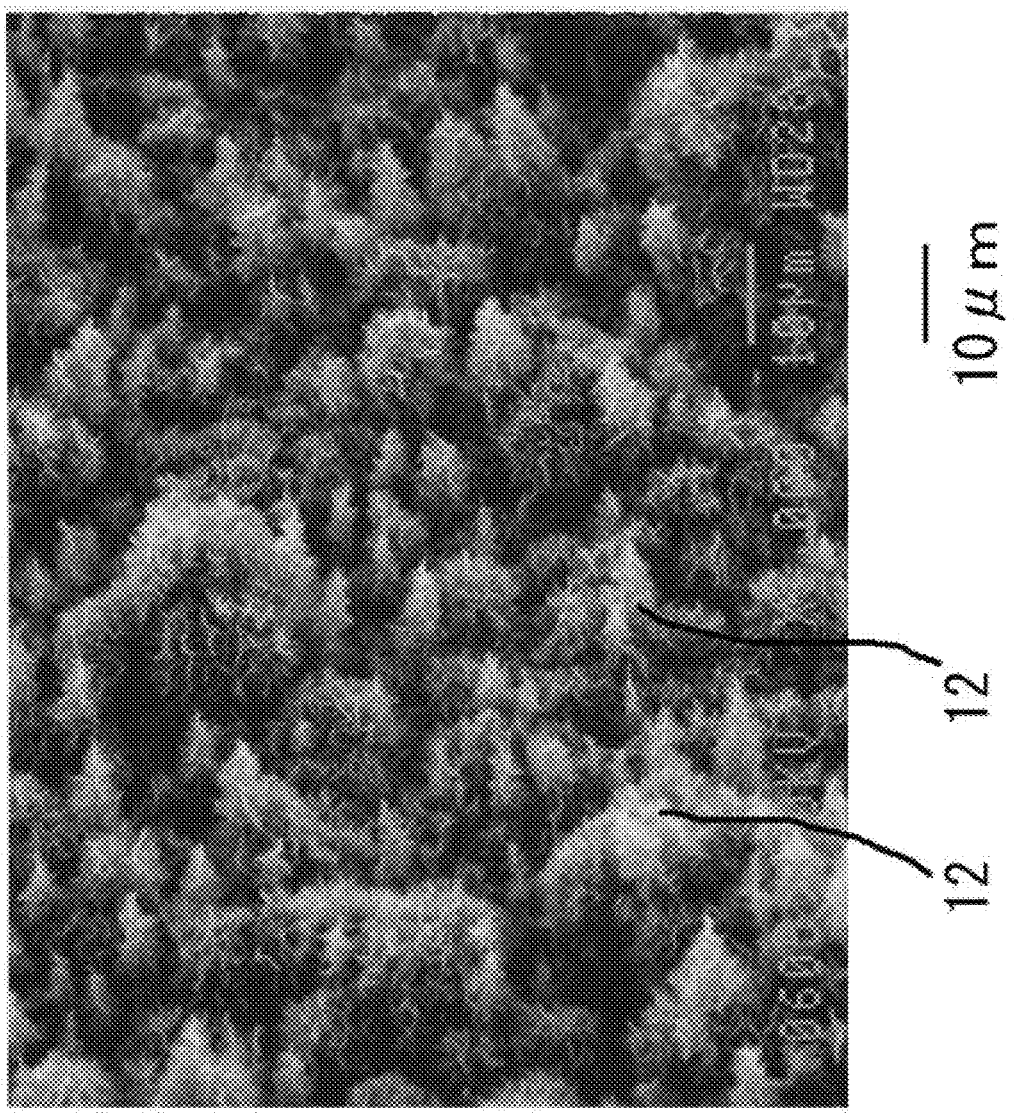
FIG. 4 depicts SEM photograph image of a carbon film required for an embodiment of the invention and positioned somewhat from an oblique direction.
Figure 5:
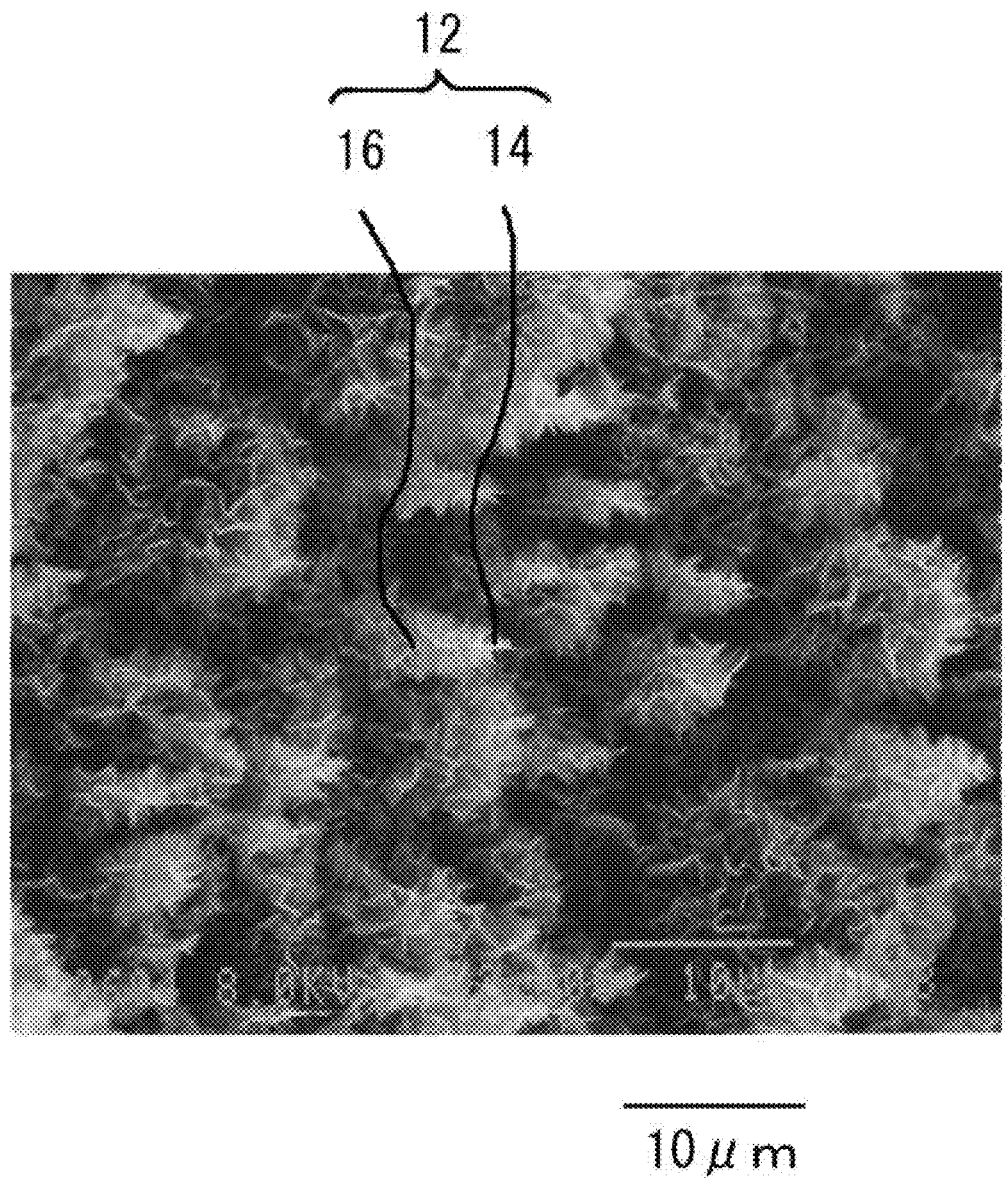
FIG. 5 depicts SEM photograph image of a carbon film required for an embodiment of the invention and positioned somewhat from an oblique direction.
Figure 6:
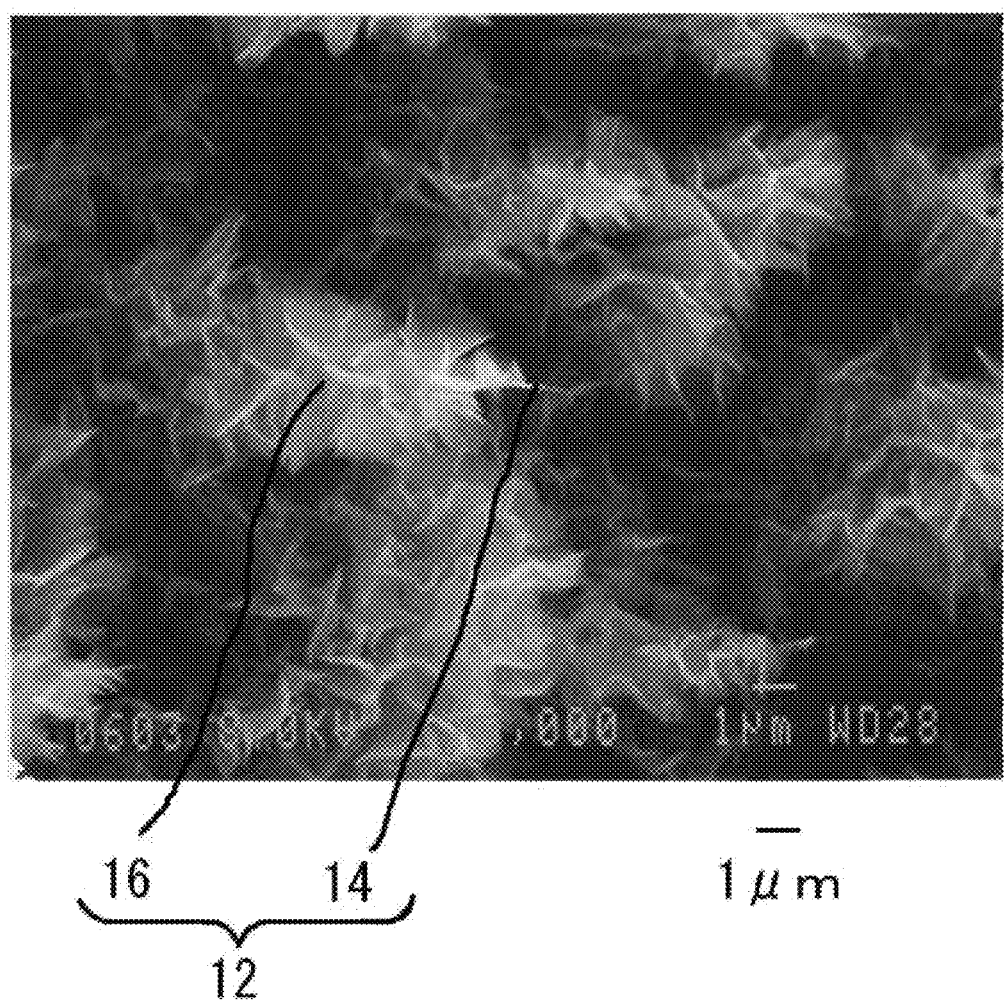
FIG. 6 depicts SEM photograph image of a carbon film required for an embodiment of the invention and positioned somewhat from an oblique direction.
Figure 7:
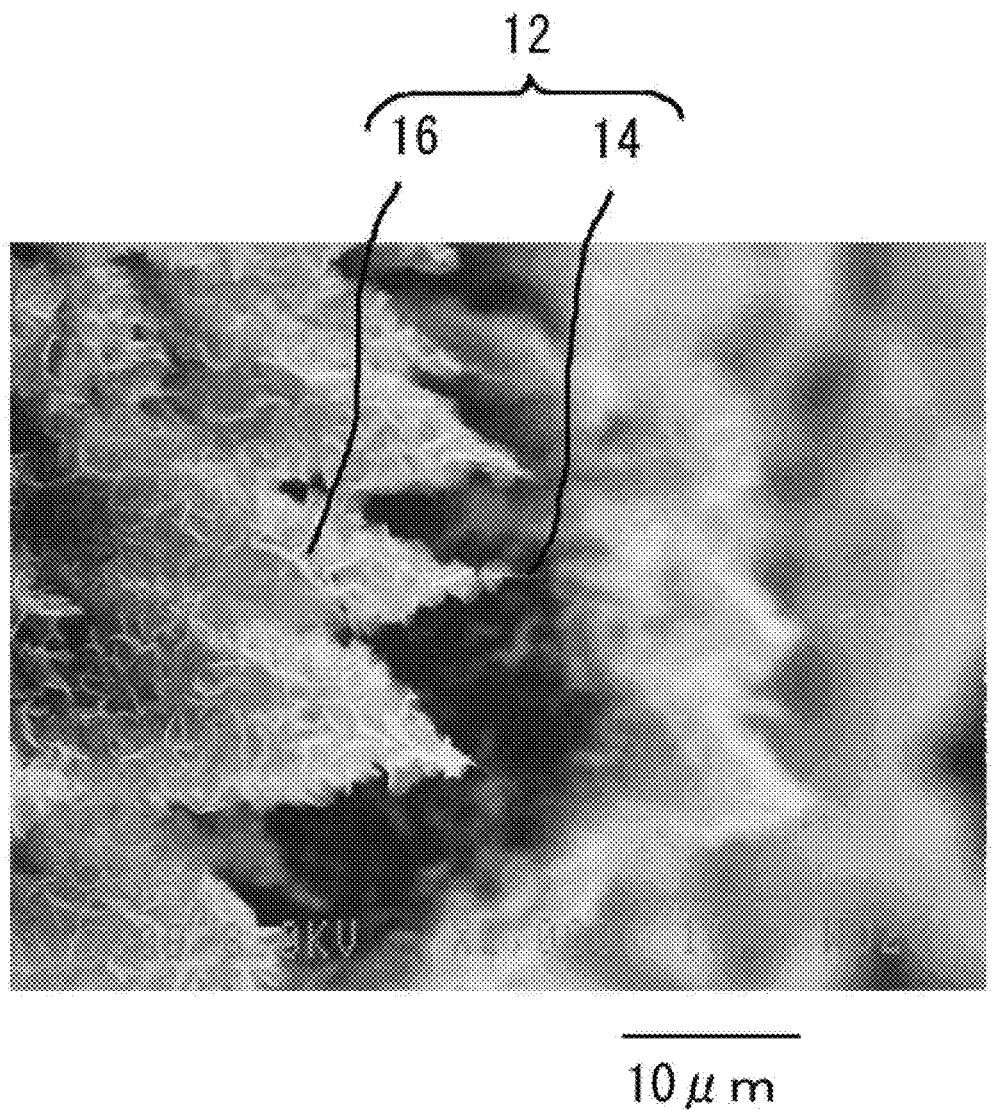
FIG. 7 depicts SEM photograph image of a carbon film required for an embodiment of the invention and positioned somewhat from an oblique direction.
Figure 8:
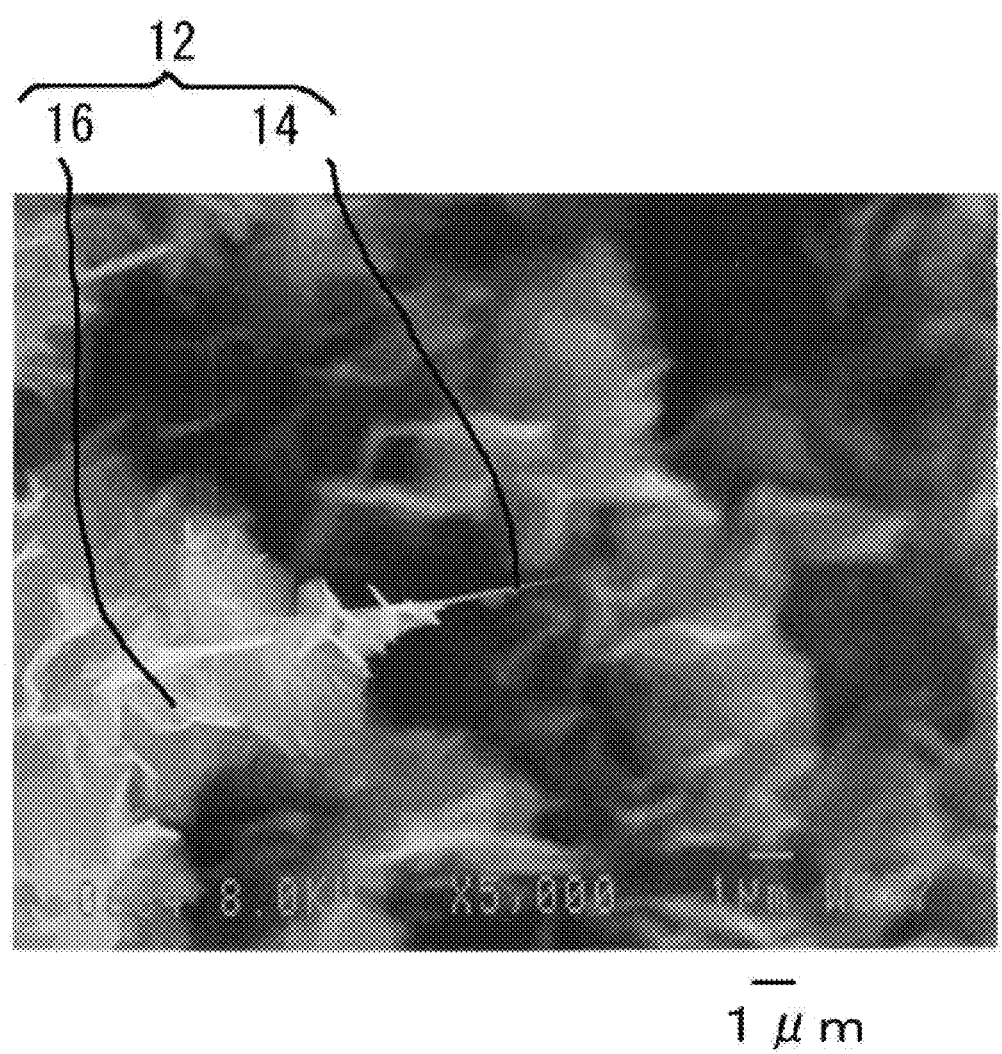
FIG. 8 is the SEM photograph image which depicts the stem-like carbon film concerning an embodiment.
Figure 9:
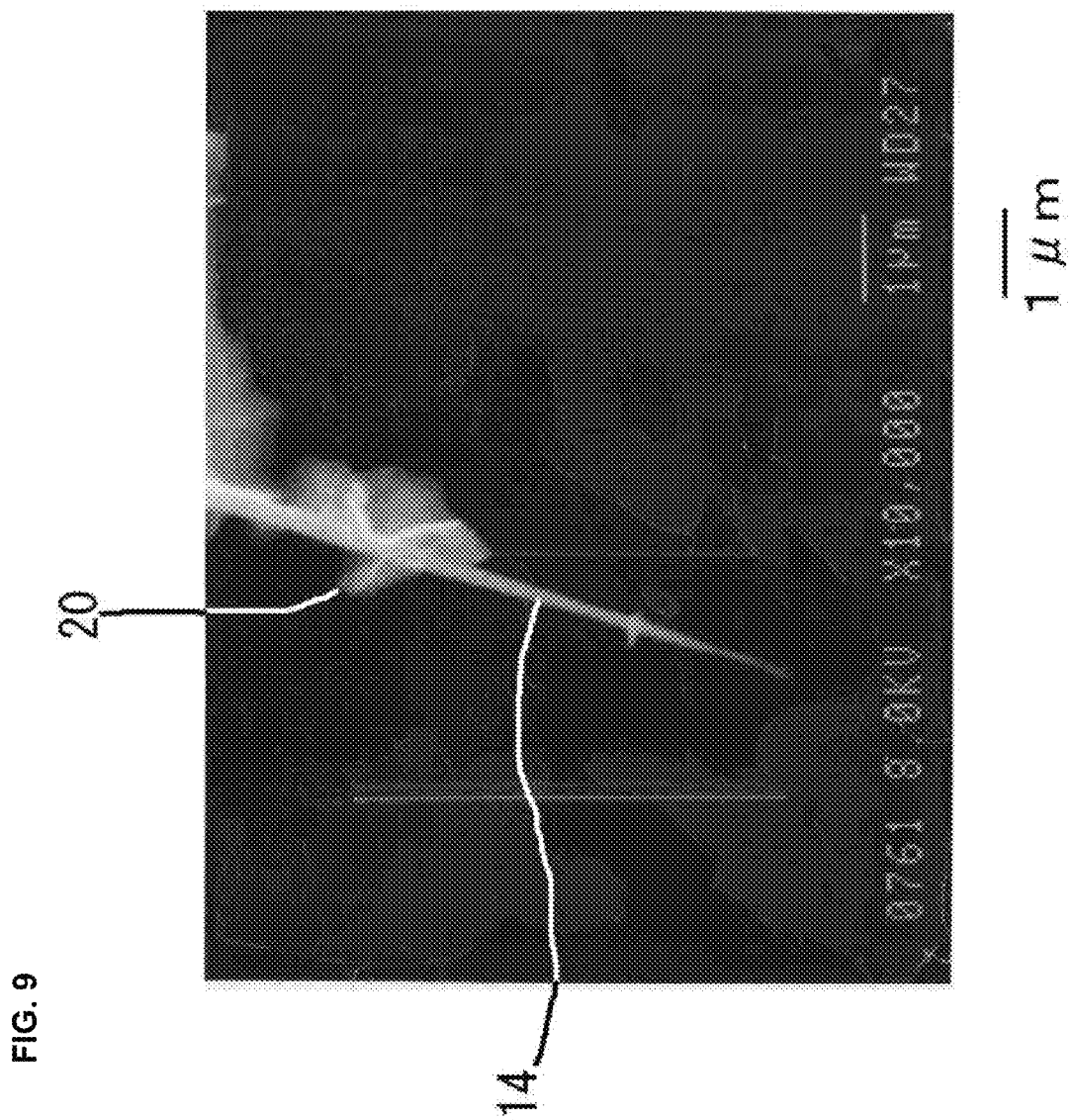
FIG. 9 is the SEM photograph image which depicts the tip of the stem-like carbon film concerning an embodiment.
Figure 10:
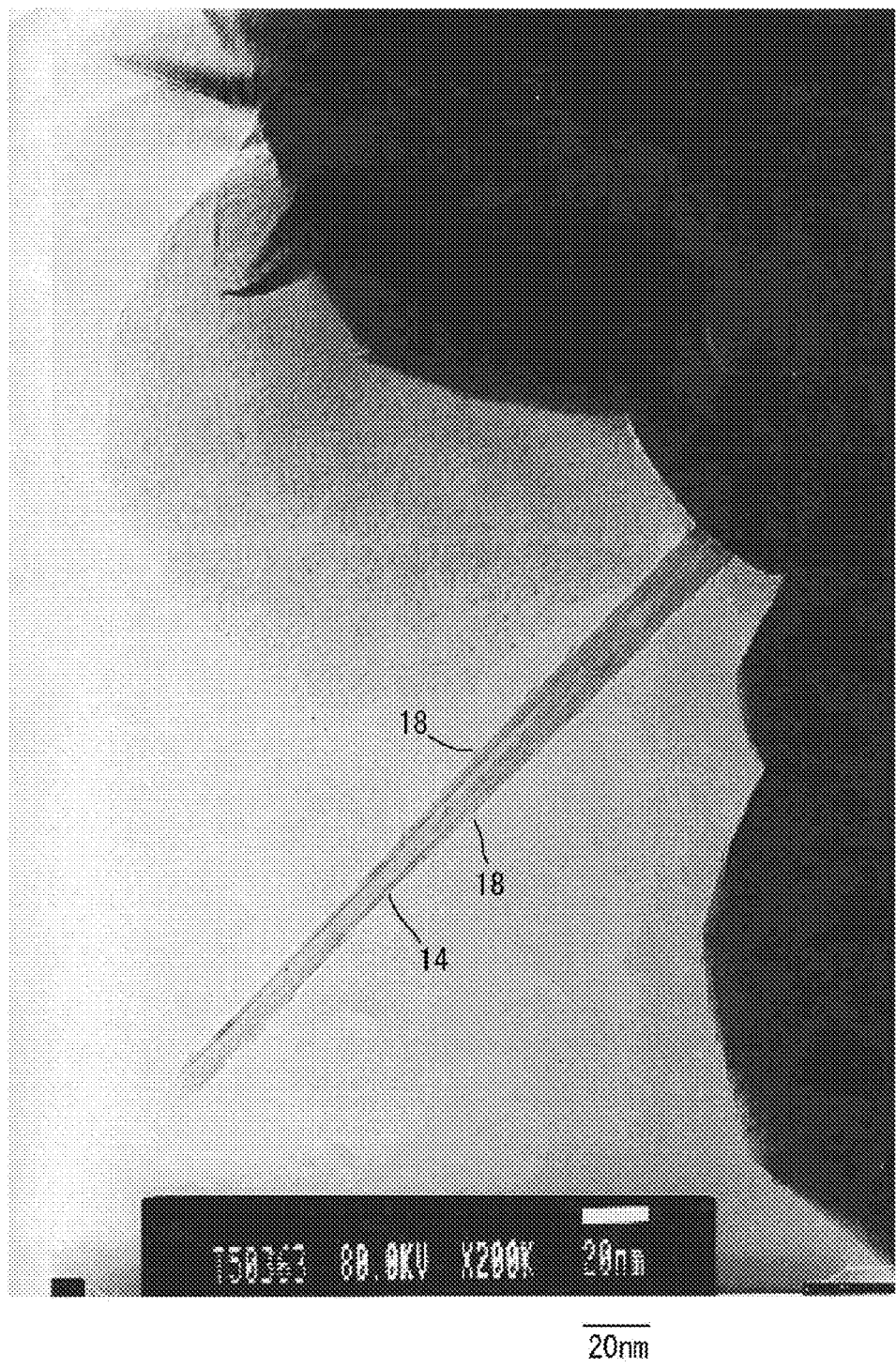
FIG. 10 depicts TEM photograph images of the near tip of the stem-like carbon film concerning an embodiment.
Figure 11:
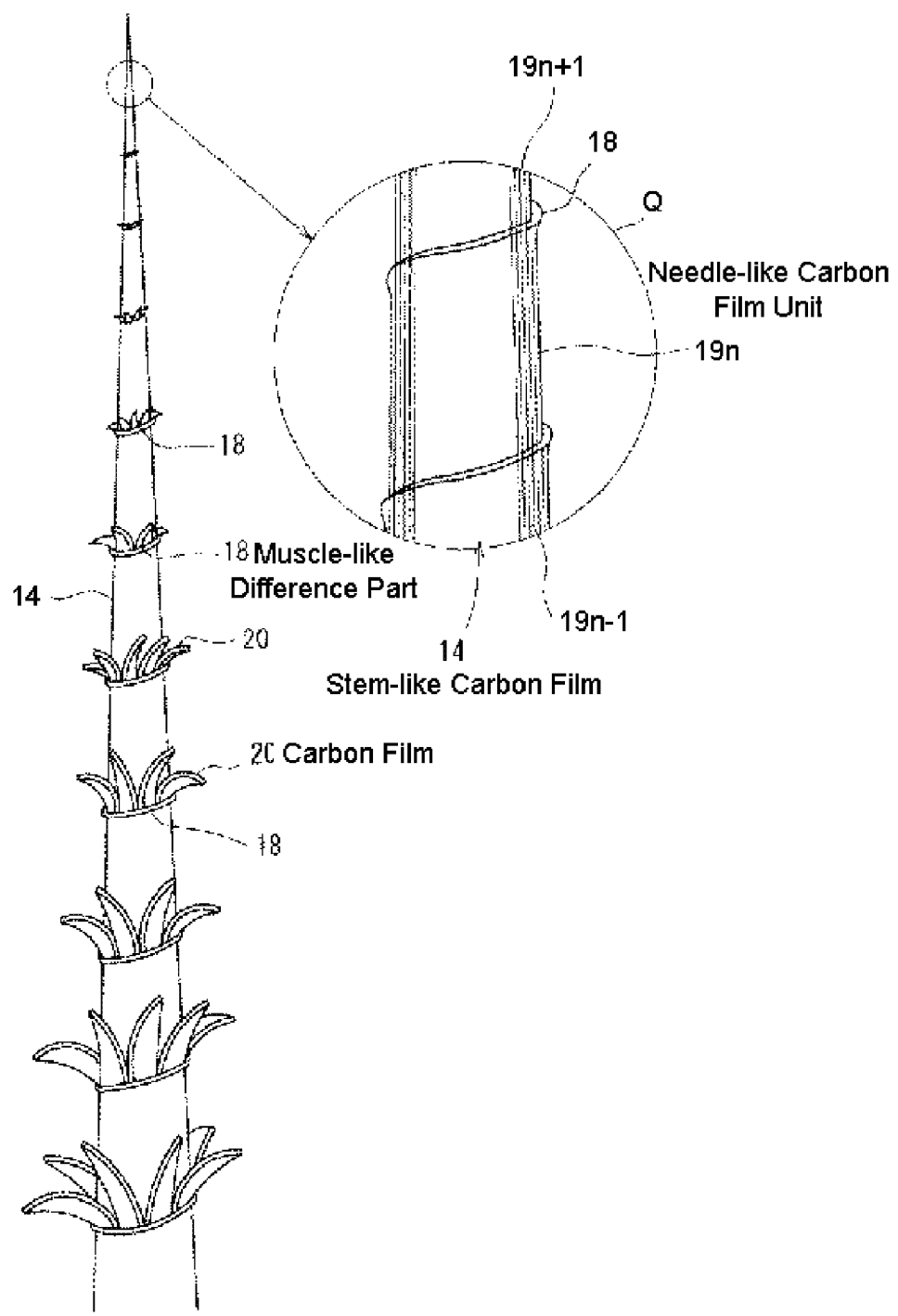
FIG. 11 is a figure showing typically the whole near tip of the stem-like carbon film concerning an embodiment.
Figure 12:
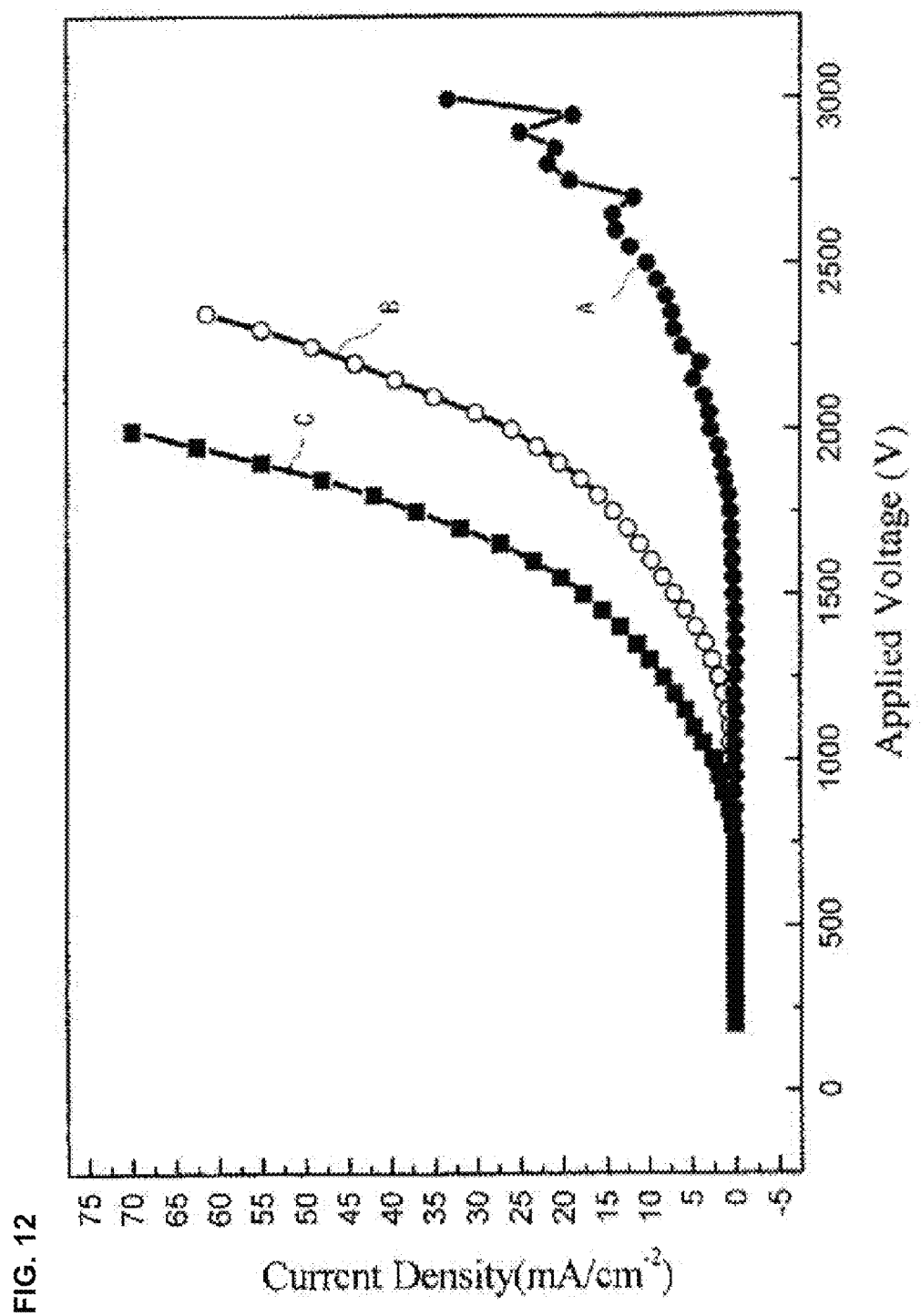
FIG. 12 is a figure depicting the IV characteristic curve of a needlelike carbon nanotube, with needlelike carbon film, and striated muscle-like level difference part carbon film (stem-like carbon film).
Figure 13:
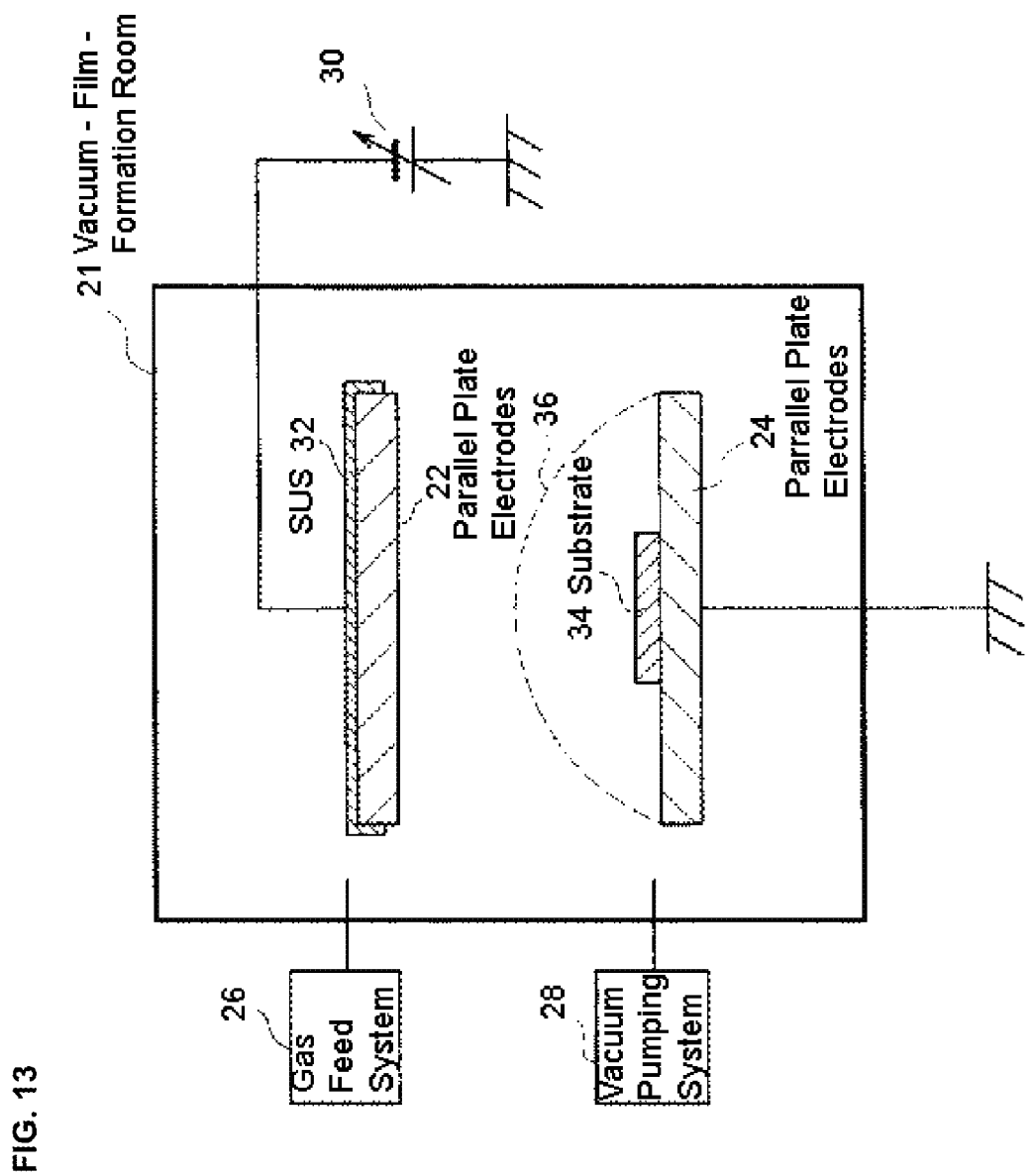
FIG. 13 is an outline line-block diagram of the manufacturing installation of a carbon film.

10 Substrate
12 Carbon film set unit
14 Stem-like carbon film
16 Branch-like carbon film group
18 Muscle-like level difference part

What is claimed is:

1. A carbon film characterized by graphene sheet multilayer overlaps, having an internal hollow, and a radius provided with an acicular shape becoming smaller towards a tip end, whereon a striated stepped portion of the film is formed spirally around the outer circumference of a peripheral face of the graphene sheet continuing toward the tip structure and sheet shape, wall shape, and pointed carbon films are formed at the striated stepped portion.

2. The carbon film according to claim 1 wherein the striated stepped portion extending from a level part is a pointed carbon film unit having an internal hollow where two or more graphene sheet layers overlap, and become spirally piled up in a stage, are constituted towards a tip section, and is formed spirally on a boundary of each of many pointed carbon film units.

3. The carbon film according to claim 2 wherein sheet shape, wall shape, and pointed carbon films are formed at the striated stepped portion.

4. A carbon film structure having two or more carbon film units where a carbon film unit is comprised of branch carbon film and stem carbon film, the branch carbon film is formed on substrate and the stem carbon film grows from the branch carbon film, and the stem carbon film is characterized by graphene sheet multilayer overlaps, having an internal hollow, and a radius provided with an acicular shape becoming smaller towards a tip end, whereon a striated stepped portion of the film is formed spirally around the outer circumference of with peripheral face of the graphene sheets continuing toward the tip structure, and a sheet shape, wall shape or needle shape carbon film is formed at the striated step portion.

5. The carbon film structure according to claim 4 wherein the branched carbon film has the striated stepped portion following a circumference of a peripheral face towards the tip concerned.

6. The carbon film structure according to claim 4 wherein a circumference of a peripheral face near a tip is turned at the tip concerned, and the striated stepped portion becomes spiral.

7. The carbon film according to claim 6 wherein the striated stepped portion forms an internally hollow acicular carbon film unit of two or more layers of overlapped graphene sheets, and becomes spirally piled up in a stage, and are constituted towards a tip, and is formed spirally on a boundary of each of acicular carbon film units.

* * * * *